C. F. BAILEY & R. H. WAINFORD.
SCOURING APPARATUS FOR SCOURING CERAMIC WARES.
APPLICATION FILED NOV. 27, 1907.

906,851.

Patented Dec. 15, 1908.

3 SHEETS—SHEET 1.

Witnesses.—
A. H. Rabsag,
J. C. H. Butler

Inventors—
Charles Frederick Bailey
Richard Hanbury Wainford
By their atty.

C. F. BAILEY & R. H. WAINFORD.
SCOURING APPARATUS FOR SCOURING CERAMIC WARES.
APPLICATION FILED NOV. 27, 1907.
906,851.
Patented Dec. 15, 1908.
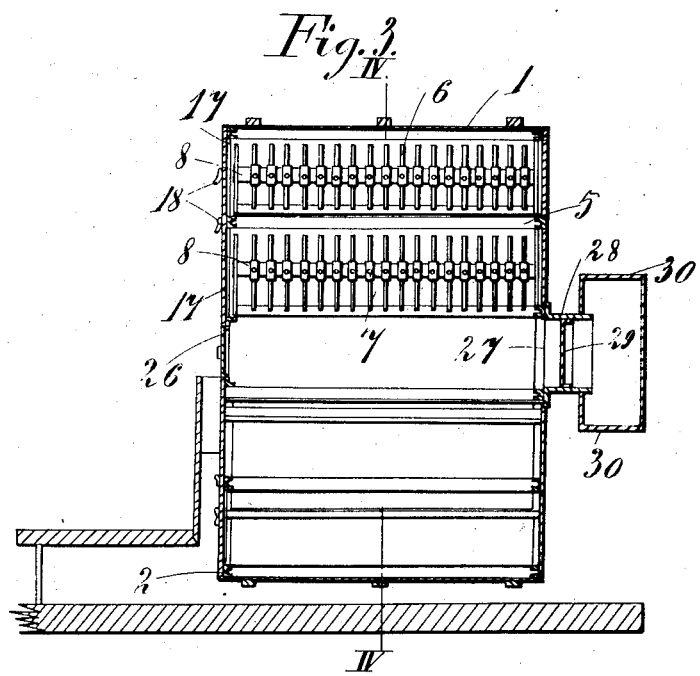
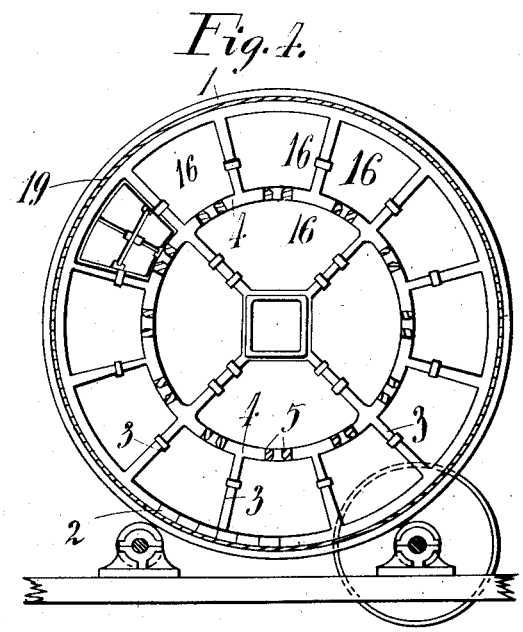

C. F. BAILEY & R. H. WAINFORD.
SCOURING APPARATUS FOR SCOURING CERAMIC WARES.
APPLICATION FILED NOV. 27, 1907.
906,851.
Patented Dec. 15, 1908.
3 SHEETS—SHEET 3.
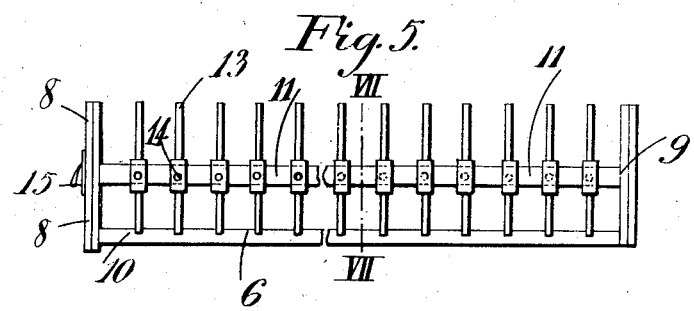
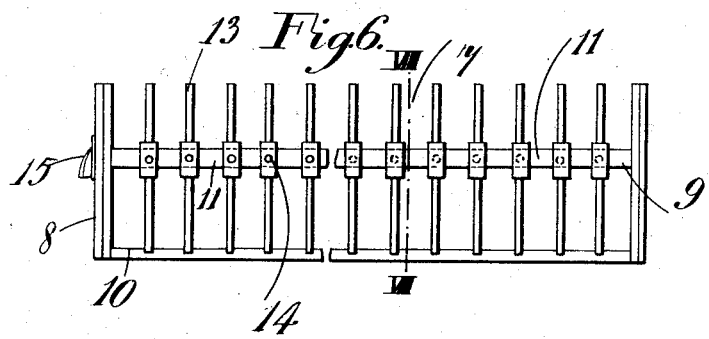
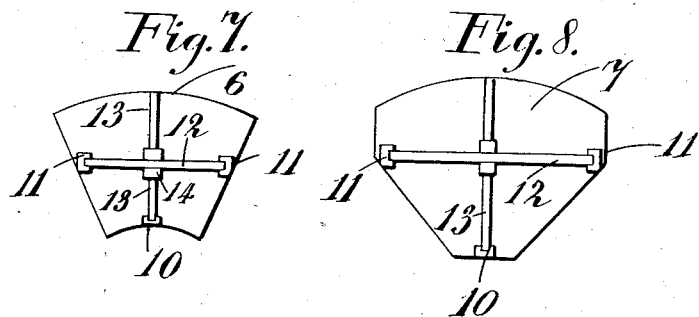

UNITED STATES PATENT OFFICE.

CHARLES FREDERICK BAILEY, OF ALSAGER, AND RICHARD HANBURY WAINFORD, OF STOKE-UPON-TRENT, ENGLAND.

SCOURING APPARATUS FOR SCOURING CERAMIC WARES.

No. 906,851.  Specification of Letters Patent.  Patented Dec. 15, 1908.

Application filed November 27, 1907. Serial No. 404,171.

To all whom it may concern:

Be it known that we, CHARLES FREDERICK BAILEY, a subject of the King of Great Britain and Ireland, residing at The Firs, Alsager, in the county of Chester, England, and RICHARD HANBURY WAINFORD, also a subject of the King of Great Britain and Ireland, residing at Caverswall Lane, Blyth Bridge, Stoke-upon-Trent, in the county of Stafford, England, have invented certain new and useful Improvements in Scouring Apparatus Suitable for Scouring Ceramic Wares, of which the following is a specification, reference being had therein to the accompanying drawings.

This invention has reference to new or improved apparatus especially suitable for use in scouring biscuit fired earthenware, that is to say, for removing from the surface of such ware flint dust or the like, such apparatus however, being applicable to any scouring operation of analogous character; and the invention has for its objects to accomplish such scouring more cheaply, expeditiously, and effectually than heretofore and at the same time to render it less unhealthy to the operative than when conducted in the manner heretofore usual.

In the scouring of ceramic ware as heretofore usually performed, the operator holds in the hand the piece of ware to be scoured, and either presses it against a revolving brush, or brushes it or sandpapers it by hand; and as the dust thus removed is liable to be inhaled, the work is of a very unhealthy character. Now according to this invention the articles to be scoured, suitably supported in open cages, are inserted within a rotatable drum containing suitable scouring material, such as silver sand, which, by the rotation of the drum, is forcibly thrown through the open cages and against the articles therein supported, thereby effectually scouring the same. In order to remove the dust due to the abrading action of the sand there is preferably passed through the drum an air-blast due to vacuum or pressure as may be convenient.

The accompanying drawings illustrate an example of apparatus according to this invention.

Figure 1:
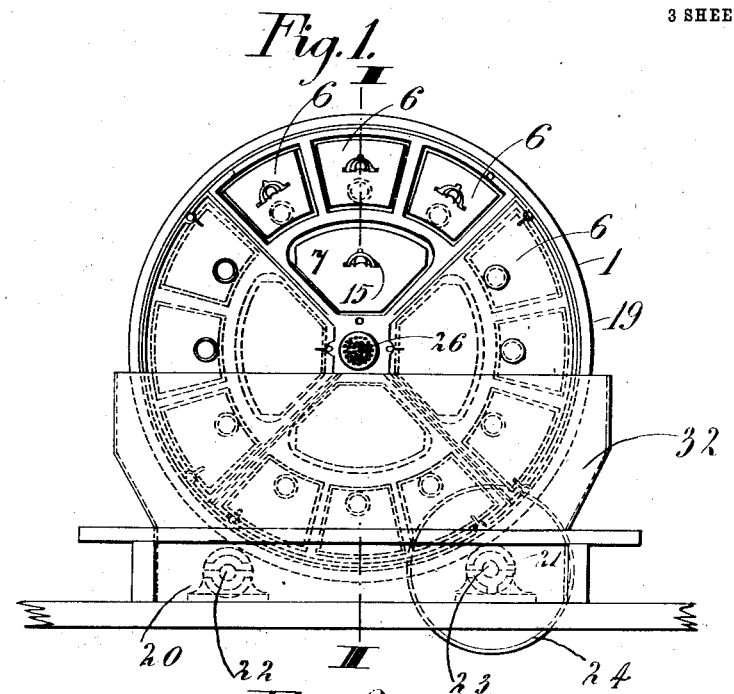
Figure 2:
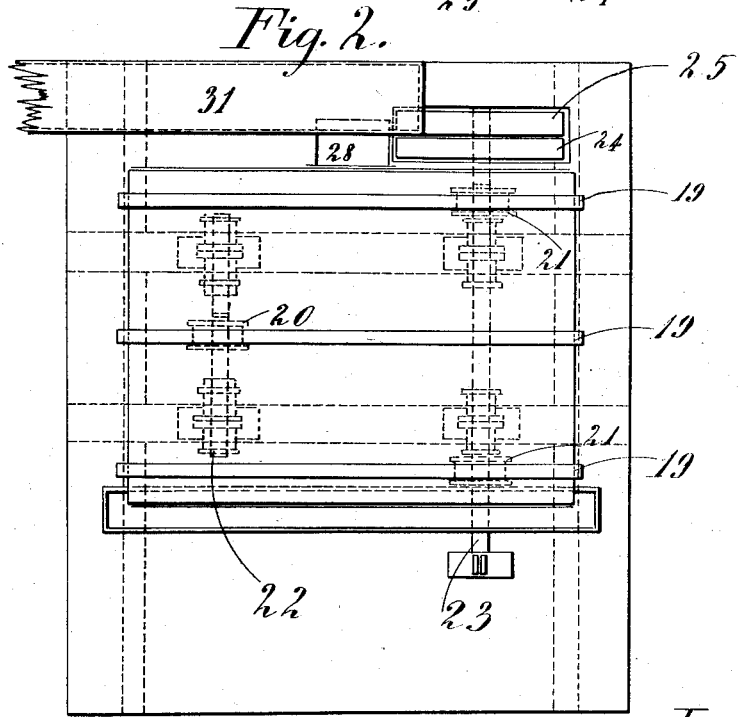

Figure 1 is a front elevation of the apparatus; Fig. 2 is a plan of the same; Fig. 3 is a longitudinal section on the line III—III of Fig. 1; Fig. 4 is a transverse section on the line IV—IV of Fig. 3; Figs. 5 and 6 are elevations on an enlarged scale of the open cages shown in Fig. 3; and Figs. 7 and 8 are corresponding transverse sections of these cages on the line VII and VIII of Figs. 5 and 6 respectively.

Within the drum 1, preferably of metal, provided, it may be, with a renewable wooden liner 2, there is secured an open framework consisting of radial bars 3, circumferential bars 4, and longitudinal bars 5. In the arrangement shown the radial bars 3 divide the drum into four quadrantal segments, each containing accommodation for four racks but the number of such segments and of recesses therein for the reception of cages may obviously be varied. Each quadrant is, in the example shown, adapted to receive three cages 6 of the form shown in Figs. 5 and 7, and one cage 7 of the form shown in Figs. 7 and 8. These cages, which may be of wood or metal, are preferably constructed as shown; having handles on their fore ends 8, while each of their plain rear ends 9 is connected by a longitudinal lower bar 10 and side bars or rails 11. The longitudinal bars 11 are connected by horizontal rod 12, which fit into or pass through vertical rods 13 forming suitable spaces. The cages are packed with "biscuit fired" ceramic ware, such as plates, stood upright between bosses 14 on the rods 13 by placing such articles within the spaces formed by the longitudinal rods or rails 10 and 11 and the rods 12 and 13. The cages are slid by their handles 15 lengthwise into the corresponding recesses 16 in the upper quadrant of the framework, and the quadrant is then closed by a door 17 secured to the fore end of the drum by bolts or fastenings 18. The drum is then partially rotated, to bring the four compartments 16 of the remaining quadrants uppermost successively into position for filling; these compartments being thereupon filled and closed by their doors 17 in the channel already described. On the outer periphery of the drum there are provided at a suitable distance apart ribs or ridges 19 that bear against channeled or grooved metallic rollers 20, 21, on shafts 22, 23, supported horizontally or nearly so by metallic bearings secured upon a suitable floor or foundation beneath the drum 1.

Assuming that a suitable quantity of abrading material such as screened ground "pitcher" or broken earthenware, silver sand or a mixture of same or other suitable material has previously been placed upon the lower interior surface of the wood liner 2, or within the drum 1, it will be understood that, the drum being caused to rotate at a suitable speed by means of endless band or the like, passing around a driving pulley 24 keyed at or near to the rear end of the cylindrical shaft 23 on which rollers 21 are keyed or secured, such abrading material will be carried by friction and centrifugal force between the "biscuit fired" ceramic ware articles in the several cages and the articles forced edgewise through the bulk of the abrading material on the lower interior surface of the liner or drum to remove flint or the like adhering to the "biscuit fired" articles. Beside the fast pulley 24 there is provided a loose pulley 25 for stopping the rotation of the drum when desired.

Fine floating dust, removed from the ware being scoured, and fine dust formed by the abrading action of the apparatus is drawn away by an air current which passes through a metallic grid or screen 26 affixed to the fore end of the drum and through a screen 27 and pipe 28 at the rear end of the drum, by a fan 29 or the like rotating in a metallic or wood casing 30, and thence through a metallic or wood casing 31 into a box or other receptacle.

After the rotation of the drum has been stopped by means of the loose pulley 25, the uppermost door at the fore end of the drum is removed, and each cage containing scoured ware is drawn out separately by hand from its compartments, abrading material which may fall from the cage being conducted by a metallic or wood guard 32 on to a floor or foundation from which it can be removed and replaced in the drum, such fence or guard also serving to protect an attendant from accident while putting cages into the several compartments of the drum or withdrawing them therefrom, should the drum rotate.

The recesses in the framework, as already indicated, may vary in number and shape to suit the class of ware to be scoured; and the framework may comprise intermediate frames similar in size and shape to those shown, provided within the drum to form rests or supports in the event of it being desired to scour heavy pieces of ware or to construct the drum of such length as would necessitate intermediate support for the cages or additional stiffening for the drum itself. The cages will in like manner vary in transverse shape to suit the recesses.

In Figs. 5 and 6 and in Figs. 7 and 8 there are illustrated two sizes of cage, in which may be packed such articles as saucers, plates and dishes. The proportions of the cages may be modified to suit tea-pot bodies, cups, bodies of cover dishes and other biscuit-fired ware. The drum may be mounted in the manner shown on the accompanying drawings, or it may be secured upon a metallic shaft that passes centrally and longitudinally through it, and is supported at its ends in adjustable bearings, or it may have a renewable hollow or solid trunnion, secured in line at each of its ends and supported in bearings furnished, it may be, with friction rollers or balls.

What we claim is:—

1. In a scouring apparatus, the combination of a rotatable drum adapted to contain a scouring material, a cylindrical frame-work arranged within said drum and formed of radial, longitudinal and circumferential bars to provide two series of recesses, the recesses of one series being of greater area than the recesses of the other series, removable cages supported in each of said recesses and adapted to receive wares to be scoured, the cages mounted in one series of recesses being larger than the cages mounted in the other series of recesses, handles for the cages, and means for rotating the drum.

2. In a scouring apparatus, the combination of a rotatable drum adapted to contain a scouring material, a cylindrical frame-work arranged within said drum and formed of radial, longitudinal and circumferential bars to provide two series of recesses, the recesses of one series being of greater area than the recesses of the other series, removable cages supported in each of said recesses and adapted to receive wares to be scoured, the cages mounted in one series of recesses being larger than the cages mounted in the other series of recesses, handles for the cages, said cages arranged in groups, a cover secured to the drum for each of said groups whereby the cages are retained in the drum, and means for rotating said drum.

3. In a scouring apparatus, the combination of a rotatable drum adapted to contain a scouring material, a cylindrical frame-work arranged within said drum and formed of radial, longitudinal and circumferential bars to provide two series of recesses, the recesses of one series being of greater area than the recesses of the other series, removable cages supported in each of said recesses and adapted to receive wares to be scoured, the cages mounted in one series of recesses being larger than the cages mounted in the other series of recesses, handles for the cages, said cages arranged in groups, a cover secured to the drum for each of said groups whereby the cages are retained in the drum, a fan arranged at one end of the drum, rotated with the drum and having its casing communicating with the interior of the drum, said fan adapted to produce an air blast, and means for rotating said drum.

In testimony whereof we affix our signatures in the presence of two witnesses.

CHARLES FREDERICK BAILEY.
RICHARD HANBURY WAINFORD.

Witnesses:
EDWARD B. WALKER,
JOHN H. COPESTAKE.